United States Patent
Hernando

(10) Patent No.: US 9,967,126 B2
(45) Date of Patent: May 8, 2018

(54) METHOD TO GENERATE A WIRELESS WAVEFORM FOR USE IN A WIRELESS COMMUNICATION SYSTEM, A WIRELESS COMMUNICATION SYSTEM AND COMPUTER PROGRAM PRODUCTS THEREOF

(71) Applicant: Telefonica, S.A., Madrid (ES)

(72) Inventor: Javier Lorca Hernando, Madrid (ES)

(73) Assignee: Telefonica, S.A., Madrid (ES)

(*) Notice: Subject to any disclaimer, the term of this patent is extended or adjusted under 35 U.S.C. 154(b) by 0 days. days.

(21) Appl. No.: 15/632,875

(22) Filed: Jun. 26, 2017

(65) Prior Publication Data
US 2017/0373909 A1     Dec. 28, 2017

(30) Foreign Application Priority Data
Jun. 27, 2016   (EP) ................... 16382303

(51) Int. Cl.
*H04B 7/01*      (2006.01)
*H04L 27/26*     (2006.01)
(Continued)

(52) U.S. Cl.
CPC .......... *H04L 27/2675* (2013.01); *H04B 7/01* (2013.01); *H04B 17/309* (2015.01);
(Continued)

(58) Field of Classification Search
CPC ............. H04L 27/2675; H04L 27/2657; H04L 25/0202; H04L 27/233; H04L 27/2665; H04B 17/309; H04B 7/01
See application file for complete search history.

(56) References Cited

U.S. PATENT DOCUMENTS

2013/0301759 A1* 11/2013 Umeda ................. H04L 27/265
                                                    375/340
2014/0010324 A1* 1/2014 Kenney .................. H04L 27/22
                                                    375/284

OTHER PUBLICATIONS

Markku Kiviranta et al., "Constant Envelope Multicarrier Modulation: Performance Evaluation in AWGN and Fading Channels", Military Communications Conference, Oct. 17-20, 2005, pp. 1-7.

(Continued)

*Primary Examiner* — Dac Ha
(74) *Attorney, Agent, or Firm* — Sughrue Mion, PLLC

(57) ABSTRACT

A method to generate a wireless waveform for use in a wireless communication system, a wireless communication system and computer program product thereof
The method comprises the generation of a waveform for application in the wireless communication system characterized by significant phase noise, Doppler spread, multipath, frequency instability, and/or low power efficiency by at the transmitter side: creating a discrete-time instantaneous frequency signal f[n]; appending a cyclic prefix with length $L_{CP}$ to the beginning of the discrete-time instantaneous frequency signal f[n]; constructing a discrete-time unwrapped instantaneous phase φ[n]; constructing a discrete-time complex baseband signal, and appending at the beginning a Constant Amplitude Zero Autocorrelation, CAZAC, signal of length $L_{CP}$ for multipath detection; and passing the constructed discrete-time complex baseband signal through a digital-to-analog, DAC, converter to yield the continuous-time radio frequency signal s(t) after conversion to the carrier frequency.

10 Claims, 3 Drawing Sheets

(51) Int. Cl.
  *H04L 25/02* (2006.01)
  *H04L 27/233* (2006.01)
  *H04B 17/309* (2015.01)
(52) U.S. Cl.
  CPC ........ *H04L 25/0202* (2013.01); *H04L 27/233* (2013.01); *H04L 27/2657* (2013.01); *H04L 27/2665* (2013.01)

(56) References Cited

OTHER PUBLICATIONS

Steve C. Thompson et al., "Constant Envelope OFDM", IEEE Transactions on Communications, Aug. 1, 2008, pp. 1300-1312, vol. 56, No. 8.
Ahsen U Ahmed, "Reception and Performance Enhancement Techniques for Constant Envelope OFDM", UC San Diego Electronic These and Dissertations, Jan. 1, 2014.
European Search Report for EP 16 38 2303 dated Oct. 19, 2016.

* cited by examiner

METHOD TO GENERATE A WIRELESS WAVEFORM FOR USE IN A WIRELESS COMMUNICATION SYSTEM, A WIRELESS COMMUNICATION SYSTEM AND COMPUTER PROGRAM PRODUCTS THEREOF

TECHNICAL FIELD

The present invention is directed, in general, to the field of wireless communications. In particular, the invention relates to a method to generate a wireless waveform for use in a wireless communication system characterized by high Doppler spread, phase noise, frequency mismatch, multipath, and low power efficiency. The invention also relates to a wireless communication system to generate such a waveform and to computer program products thereof.

BACKGROUND OF THE INVENTION

Orthogonal Frequency Division Multiplexing (OFDM) is a proven access technique for efficient user and data multiplexing in the frequency domain. One example of a system employing OFDM is Long-Term Evolution (LTE). LTE is the next step in cellular Third-Generation (3G) systems, which represents basically an evolution of previous mobile communications standards such as Universal Mobile Telecommunication System (UMTS) and Global System for Mobile Communications (GSM). It is a Third Generation Partnership Project (3GPP) standard that uses scalable bandwidth from 1.4 to 20 MHz in order to suit the needs of network operators that have different bandwidth allocations. LTE improves spectral efficiency in networks, allowing carriers to provide more data and voice services over a given bandwidth. Other wireless standards like WiFi (IEEE 802.11) or WiMAX (IEEE 802.16) also employ OFDM.

Among the disadvantages of OFDM, its sensitivity to Doppler, phase noise and frequency mismatches, as well as its large peak-to-average power ratio (PAPR) are among the hardest to combat. Large PAPR signals translate into low efficiency of the power amplifiers (PAs), because the PA operating point should be designed in the linear region hence requiring large back-off values (of the order of 10 dB or more) and consequently low PA efficiencies. This drawback is accentuated at high frequencies because radio frequency (RF) hardware above 6 GHz can present low power efficiency. Sensitivity to frequency misalignments is also critical at high frequencies, as well as the Doppler spread caused by movements of the user and/or the environment which linearly increases with carrier frequency. Phase noise caused by RF oscillators is yet another issue as it brings non-additive impairments at the receiver side which also grow with frequency.

The usual approach to deal with large phase noise and/or large Doppler spreads in multicarrier waveforms is to increase the subcarrier width. However large subcarrier widths lead to channels that can be non-flat inside each subcarrier, hence requiring intra-subcarrier equalization and complicating the receiver's design. On the other hand, subcarrier width is inversely related to the OFDM symbol duration and this has a minimum limit determined by the minimum duration of the basic time transmission interval (TTI), which in turn impacts the numerology of the wireless communications system.

Some solutions to reduce PAPR involve single-carrier waveforms (like single carrier frequency division multiple access, SC-FDMA), which reduce PAPR by several dB, particularly with low-order constellations [4]. Other approaches involve constant-envelope or quasi-constant-envelope waveforms with continuous phase [5]. The approach in [1] comprises an OFDM signal modulating the phase of a constant-amplitude signal. This approach is attractive as it provides better robustness against phase and frequency impairments than OFDM. However, only Additive White Gaussian Noise (AWGN) channels are considered. Mobile radio channels, or wireless channels, usually exhibit a number of highly varying impairments, including the effects of multipath and Doppler spread. Such impairments demand specific techniques at the receiver particularly at very high frequencies.

More adequate waveforms are therefore highly desirable in order to overcome the impact of power inefficiency, Doppler spread, phase noise, and frequency instability in mobile wireless channels.

DESCRIPTION OF THE INVENTION

To that end, the present invention proposes according to an aspect a method to generate a new waveform for application in wireless communications systems characterized by significant phase noise, Doppler spread, multipath, frequency instability, and/or low power efficiency.

The proposed waveform, generated by a transmitter, has constant amplitude in the discrete-time complex baseband representation:

$$s[n] = \exp\{j\varphi[n]\}.$$

The discrete-time instantaneous phase signal $\varphi[n]$ can be obtained as a summation of the discrete-time instantaneous frequency signal in the form:

$$\phi[n] = \phi_{-1} + 2\pi \sum_{n'=0}^{n} f[n'],$$

where $\varphi_{-1}$ is an initial phase value, and the instantaneous frequency f[n] has the form of an OFDM signal where the useful part of the symbol $\tilde{f}[n]$ (excluding a cyclic prefix) is constructed from the symbols to transmit x[k] after avoiding the first and the last $k_0$ subcarriers:

$$\tilde{f}[n] = m \cdot \sum_{k=k_0}^{N-k_0-1} x[k] \exp\left(j\frac{2\pi k n}{N}\right);$$

$$n = 0, 1, \ldots, N-1.$$

Subcarriers reserved for time offset estimation, carrying complex symbols known by a receiver, must be interspersed among the subcarriers reserved for data in order to compensate for any time synchronization errors at the receiver. A cyclic prefix (CP) is also added at the beginning of the instantaneous frequency signal to cope with such synchronization errors. In addition, a constant-amplitude Zero Autocorrelation (CAZAC) signal is appended at the beginning of the waveform for multipath estimation and detection.

This waveform has significant robustness against impairments caused by phase noise, Doppler, and carrier frequency offsets. These impairments can be rejected by the receiver provided that the cutoff subcarrier $k_0$ is higher than the maximum frequency component of the instantaneous frequencies associated to the above impairments.

The receiver first estimates the complex amplitudes and delays associated to the different multipath components, and then obtains the instantaneous phase signal. After obtaining the instantaneous frequency signal, removing the cyclic prefix, and taking the Discrete Fourier Transform (DFT), it is possible for the receiver to estimate and compensate any eventual time synchronization error resulting from multipath detection. Examination of the frequency components of the instantaneous frequency signal will allow the receiver to reject impairments that are located below the cutoff subcarrier $k_0$.

By cutoff subcarrier $k_0$ it has to be understood a minimum subcarrier index of the spectral components of the instantaneous frequency signal above which no significant Doppler, phase noise and/or Carrier Frequency Offset (CFO) impairments are present at the received signal.

The cutoff subcarrier $k_0$ can be estimated by passing an unmodulated constant-envelope signal through a wireless channel that contains the intended impairments, obtaining the frequency contents of the discrete-time instantaneous frequency signal, and choosing a value above the highest subcarrier having non-negligible signal contents at the worst operating conditions (e.g. maximum user speed, CFO or phase noise).

The proposed waveform has advantages when significant phase noise, Doppler, and/or carrier frequency offsets are present in the system. The value of $k_0$ determines the extent to which the proposed waveform can cope with those impairments. It is also especially indicated with carrier frequencies above 6 GHz, when the user speed is very high, or when phase noise coming from the local oscillators is significant.

Other aspects that are disclosed herein also include a wireless communication system, and software programs to perform the method, embodiment steps and operations summarized above and disclosed in detail below. More particularly, a computer program product is one embodiment that has a computer-readable medium including computer program instructions encoded thereon that when executed on at least one processor in a computer element causes the processor to perform the operations indicated herein as embodiments of the invention.

Even, other aspects of the present invention may also include a transmitter comprising a waveform generation unit, configured for generating the proposed waveform by receiving the signal from a CAZAC unit and from a frequency generation plus CP insertion unit, both of which deliver necessary elements for the creation of the proposed waveform, and a receiver, characterized by some CFO and phase noise, among other impairments, including different units configured for implementing a procedure for recovering the transmitted information.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Figure 1:
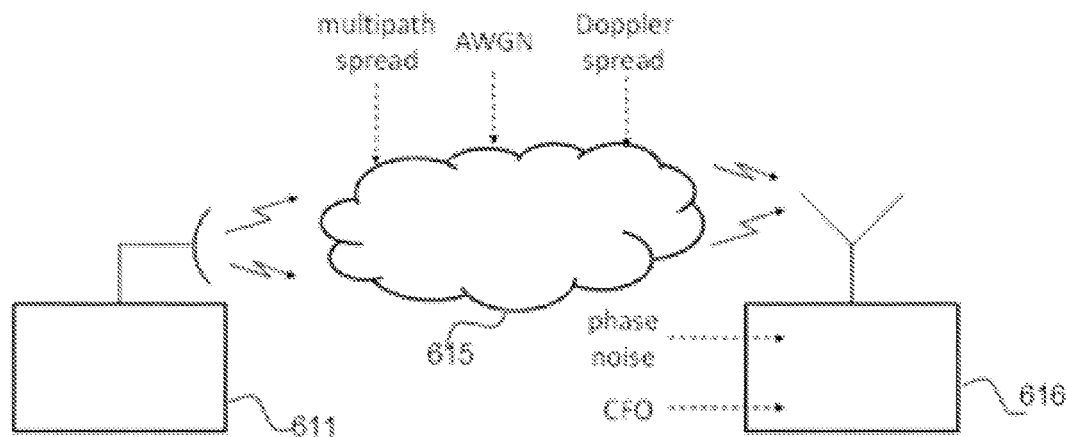
FIG. 1 is a schematic example of the proposed wireless communication system to implement a method to generate a wireless waveform for use in such a wireless communication system.

With reference to FIG. 1, the proposed wireless communication system comprises a non-ideal wireless transmitter 611, a wireless channel 615 that introduces a number of impairments on a wireless signal transmitted by the transmitter 611, and a non-ideal wireless receiver 616. Non-ideality of the transmitter 611 and receiver 616 translates into multiple signal impairments upon reception of the signal, among which the present invention will focus on: phase noise, caused by unwanted modulation of the ideal RF carrier signal with random noise; and Carrier Frequency Offset (CFO), caused by any frequency mismatches between the transmitter and receiver oscillators.

At the same time, the wireless channel 615 introduces at least the following impairments: Doppler spread, caused by superposition of multiple signal components at the receiver 616, each with different Doppler shifts as caused by movement of a user and/or the environment; multipath spread, caused by reflection, diffraction and scattering leading to multiple copies of the transmitted signal at the receiver 616, each with different amplitudes, phases and delays; and AWGN, unavoidable source of random errors caused by random movements of electrons in any electronic circuit.

Some of the above impairments can become more significant when going up in carrier frequency, such as Doppler spread and phase noise. However the present invention is not restricted to any particular carrier frequency.

Waveform Definition

The proposed waveform has constant amplitude in the equivalent low-pass signal representation. Constant-amplitude signals can benefit from the use of power amplifiers (PA) at the transmitter 611 operating in their non-linear region, hence increasing efficiency compared to the linear case as no (or very little) PA back-off is required.

The following expression represents a generic constant-amplitude signal where the information is contained in the phase rather than in the amplitude:

$$s(t)=A\cos\{2\pi f_c t+\varphi(t)\},$$

where A is a normalization constant that accounts for the desired transmission power, $f_c$ is the carrier frequency, $\varphi(t)$ denotes a real signal conveying the information, and $j=\sqrt{-1}$ represents the imaginary component in the complex plane. The equivalent low-pass signal has the form $s(t)=A\exp\{j\varphi(t)\}$ and therefore has a constant envelope. The PAPR of the RF signal is then equal to 3 dB, whilst the PAPR of the complex baseband signal is equal to 0 dB.

The approach followed in so-called phase-modulated OFDM (PM-OFDM) from prior art, for which the above expression is applicable, is to let φ(t) be proportional to a real time-domain OFDM signal. The drawback of this approach is that the resulting signal is very sensitive to phase noise, Doppler and other impairments affecting the phase.

In this invention, and contrary to prior art, the waveform is designed for increased robustness against Doppler spread, phase noise, and carrier frequency offsets. The proposed waveform has constant amplitude and can also be written in the above form, but the phase is now obtained from integration of an instantaneous frequency signal that is made dependent on the desired signal. Switching to the discrete-time signal representation after analog-to-digital (ADC) conversion it can be written:

$$s[n] = \exp\{j\phi[n]\},$$

$$\phi[n] = \phi_{-1} + 2\pi \sum_{n'=0}^{n} f[n'],$$

$$f[n] = \begin{cases} \tilde{f}[N - L_{CP} + n], n = 0, \ldots, L_{CP} - 1 \\ \tilde{f}[N - L_{CP}], n = L_{CP}, \ldots, N + L_{CP} - 1 \end{cases},$$

$$\tilde{f}[n] = m \cdot \sum_{k=k_0}^{N-k_0-1} x[k] \exp\left(j\frac{2\pi k n}{N}\right);$$

$$n = 0, 1, \ldots, N - 1,$$

where $s[n]$ is the discrete-time complex baseband signal; $\varphi_{-1}$ is an (arbitrary) initial phase value; $f[n]$ is the discrete-time instantaneous frequency which has the form of an OFDM signal; $\tilde{f}[n]$ is the useful part of $f[n]$ after excluding the cyclic prefix; $\varphi[n]$ is the discrete-time instantaneous phase; N is the OFDM symbol length; $L_{CP}$ is the length of the cyclic prefix; $k_0$ is an integer satisfying $0<k_0<N/2$; m is a modulation index (in Hz per unit amplitude); and $x[k]$ denotes the complex constellation symbol carrying the information at the k-th subcarrier.

The discrete-time instantaneous frequency $f[n]$ is related to the discrete-time instantaneous phase $\varphi[n]$ by application of a discrete difference operator. There are several definitions for the discrete difference operator, but the proposed method will stick to the so-called backwards difference operator $\nabla$ yielding:

$$f[n] = \frac{1}{2\pi}\nabla\phi[n] = \frac{1}{2\pi}(\phi[n] - \phi[n-1]),$$

$$n = 1, \ldots, N - 1,$$

with initial value $f[0]=(\varphi[0]-\varphi_{-1})/2\pi$.

Note that the information is now contained in the instantaneous frequency in the form of an OFDM symbol, with its corresponding cyclic prefix for easier time synchronization, but the summation of complex exponentials (subcarriers) must avoid the first and the last $k_0$ terms. This will be critical to ensure robustness against Doppler, phase noise and other channel impairments. The instantaneous frequency must be real for the waveform to be of constant amplitude, hence $x[k]$ must satisfy the Hermitian property:

$$x[k]=x^*[(-k)\bmod N], k=0,\ldots,N-1,$$

where * denotes the complex conjugate operator, and a mod b yields the remainder of a/b such that $0 \le a \bmod b \le N-1$. This limits the number of coefficients carrying payload information to $\lceil N/2 \rceil$, where $\lceil\ \rceil$ denotes the rounding towards infinity operation.

Once having the discrete-time phase $\varphi[n]$, it is easy to obtain the discrete-time baseband complex signal $s[n]=\exp j\{\varphi[n]\}$ which after digital-to-analog (DAC) conversion and further translation to the carrier frequency yields the modulated waveform $s(t)=A\cos\{2\pi f_c t + \varphi(t)\}$.

The proposed waveform can show significant robustness against Doppler, phase noise and CFO, as well as improved energy efficiency. These properties are particularly beneficial at higher frequencies (like mm-waves), but come at the cost of a lower spectral efficiency compared to prior-art waveforms like standard OFDM. Spectral efficiency is however not a major issue in mm-waves because of the large bandwidths available (from several hundreds of MHz to few GHz). In contrast, mm-wave communications can suffer from strong Doppler, significant phase noise and CFO, as well as low transmission powers. In this context the proposed waveform can present significant benefits if the loss in spectral efficiency is not a major concern.

Robustness to Channel Impairments

In contrast to prior art techniques, the following impairments can be rejected by using the proposed waveform:

Doppler spread: the Doppler spectrum will be non-zero within the range $[-f_D, f_D]$, where $f_D = c \cdot f_c/v$ is the maximum Doppler shift. Hence discarding frequency components between $[0, k_0]$ and $[N-1-k_0, N-1]$ in the instantaneous frequency signal $f_I[n]$ will effectively reject Doppler provided that $k_0>k_D$, where $k_D$ is the highest subcarrier with non-negligible signal contents for the instantaneous frequency of the Doppler.

Phase noise: the phase noise spectrum typically comprises non-zero values in a bandwidth inversely proportional to the oscillator's Q factor. Hence if $k_0>k_{PN}$ the effect of phase noise will be ideally compensated at the receiver, where $k_{PN}$ is the highest subcarrier with non-negligible signal contents for the instantaneous frequency of the phase noise.

CFO: this impairment will exhibit a sharp spectral component at the difference between the oscillator frequencies at the transmitter and receiver. Hence if $k_0>k_{CFO}$ the effects of frequency mismatch will be ideally compensated at the receiver, where $k_{CFO}$ is the highest subcarrier with non-negligible signal contents for the instantaneous frequency of CFO.

To prove the above mentioned benefits, it is supposed that the transmitted signal passes through the wireless channel 615 characterized by an AWGN component and a number L of multipath components. In addition, it is supposed that there is significant Doppler spread, phase noise, and CFO caused by both the user's mobility and the oscillators' characteristics. The continuous-time received signal r(t) can then be written as:

$$r(t) =$$

$$a(t) \cdot \sum_{l=0}^{L-1} b_l(t) \exp j\{2\pi f_c(t - \tau_l) + \phi(t - \tau_l) + \alpha_l + \phi_{D,l}(t) + \phi_P(t) + \phi_C(t)\} +$$

$$n_0(t),$$

where a(t) is an amplitude factor accounting for the combined effects of path loss and large-scale fading; $f_c$ is the carrier frequency; L is the number of channel multipaths (or taps); $b_l(t)$ is the small-scale fading amplitude of the l-th multipath; $\tau_l$ is the delay associated to the l-th multipath; $\alpha_l$ is the phase of the l-th multipath; $\varphi_{D,l}(t)$ is the phase of the Doppler component associated to the l-th multipath; $\varphi_P(t)$ is the phase noise component; $\varphi_C(t)$ is the phase of the CFO component; and $n_0(t)$ is a complex AWGN component.

It is assumed in the above expression that the phase noise component $\varphi_P(t)$ and the CFO component $\varphi_C(t)$ have the same impact over all the multipath signals. This is reasonable as phase noise and CFO only depend on the receiver's oscillator performance.

The phase $\varphi_{D,l}(t)$ is associated to a Doppler component characterized by a Doppler spectrum which, for uniform Rayleigh scattering and omni-directional reception, is the classical Jakes' spectrum given by [6]:

$$S(f_d) = \frac{1}{\pi f_D \sqrt{1 - (f_d/f_D)^2}},$$

where $S(f_d)$ is the Doppler power spectral density as a function of the Doppler frequency shift $f_d$ (relative to carrier frequency); $f_D = c \cdot f_c/v$ is the maximum Doppler shift; v is the user's speed; and c is the speed of light. At high frequencies, the presence of beamforming can influence the resulting Doppler spectrum thus resembling a Doppler shift when the beamforming gains are significant [2]. In any case, Doppler spectrum cannot extend beyond the range $[-f_D, f_D]$.

Switching to the discrete-time baseband representation, the discrete-time complex baseband waveform can be written as:

$$r[n] = a[n] \cdot \sum_{l=0}^{L-1} b_l[n] \exp j\{-2\pi f_c \tau_l + \phi[n - \tau_l] + \alpha_l + \phi_{D,l}[n] + \phi_P[n] + \phi_C[n]\} + n_0[n].$$

Absorbing the constant-phase terms as well as the time-varying terms together into two different components, the following expression can be written:

$$r[n] = a[n] \cdot \sum_{l=0}^{L-1} b_l[n] \exp j\{\phi'_l[n] + \alpha'_l\} + n_0[n],$$

where $\alpha'_l$ is a constant phase term and $\varphi'_l[n]$ is a time-varying term containing the information, Doppler spread, phase noise, and CFO components for multipath l:

$\varphi'_l[n] = \varphi[n-\tau_l] + \varphi_{D,l}[n] + \varphi_P[n] + \varphi_C[n]$ $\alpha'_l = -2\pi f_c \tau_l + \alpha_l$ In the proposed method it is also assumed that the receiver 616 is able to discriminate between the different multipath components $r_l[n]$ and estimate their associated delays $\tau_l$, amplitudes $a[n] \cdot b_l[n]$ and phases $\alpha'_l$. This can be achieved by means of cross-correlations of the received signal with pre-defined sequences appended at the beginning of the waveform, which enables estimation of the complex amplitudes and delays of the multipath components. Assuming that the phase terms of Doppler, phase noise and CFO impairments present much slower variations than $\varphi[n]$, and that the different Doppler components approximately differ on some constant phases i.e. $\varphi_{D,l}[n] \approx \varphi_D[n] + \varphi_{0,l}$, it can be written:

$$r[n] \cong \sum_{l=0}^{L-1} A_l[n] \cdot \exp j\{\Phi[n - \tau_l]\} + n_0[n],$$

where $A_l[n] = a[n] \cdot b_l[n] \cdot \exp j(\alpha'_l + \varphi_{0,l})$ is the complex amplitude of the l-th multipath that includes the constant phase $\varphi_{0,l}$ associated to Doppler, and the global phase term $\Phi[n]$ contains the desired signal as well as the time-varying impairments plus some random noise $\varphi_0[n]$:

$\Phi[n] \equiv \varphi[n] + \varphi_D[n] + \varphi_P[n] + \varphi_C[n] + \varphi_0[n].$ The above approximation comes from the fact that Doppler, phase noise and CFO will present much slower variations than the desired signal. Hence, neglecting the random noise component for illustrative purposes, delaying the overall phase has approximately the same effect as delaying only the information-bearing phase term $\varphi[n]$, because the other terms remain approximately constant over the short time scale of the delay spread:

$$\Phi[n - \tau_l] = \phi[n - \tau_l] + \phi_D[n - \tau_l] + \phi_P[n - \tau_l] + \phi_C[n - \tau_l]$$

$$\cong \phi[n - \tau_l] + \phi_D[n] + \phi_P[n] + \phi_C[n]$$

Then, assuming that the values of the complex amplitudes $A_l[n]$ and delays $\tau_l$ are known, it will be possible to derive $\Phi[n]$ by solving the above difference equation, e.g. by means of an Infinite Impulse Response (IIR) filter over the received signal r[n].

The discrete-time instantaneous frequency f[n] can be obtained by means of the discrete backwards difference operator applied to the phase (analogous to the derivative operator in the continuous case):

$$f[n] \equiv \frac{1}{2\pi} \nabla \Phi[n] = \frac{1}{2\pi} (\nabla \phi[n - \tau_l] + \nabla \phi_D[n] + \nabla \phi_P[n] + \nabla \phi_C[n] + \nabla \phi_0[n]),$$

where $\nabla x[n] \equiv x[n] - x[n-1]$. The terms in the above equation are proportional to the instantaneous frequencies of the desired signal ($\nabla \varphi[n-\tau_l]$), Doppler component $\nabla \varphi_D$), phase noise component ($\nabla \varphi_P$), and CFO ($\nabla \varphi_C$). The forward difference operator, defined as $\Delta x[n] \equiv x[n+1] - x[n]$, can also be employed but it yields slightly different results. The proposed method will stick to the use of the backwards difference operator.

It is apparent that, apart from the noise term $\nabla \varphi_0[n]$, the remaining impairments can be rejected by discarding all frequency components of $\nabla f[n]$ that are below a certain subcarrier index. Both the Doppler and phase noise terms will exhibit zero frequency components above a certain subcarrier, and the CFO will also exhibit a sharp spectral line. By mapping payload data to subcarriers above such subcarrier index, it will be possible for the receiver 616 to effectively reject the above mentioned impairments.

To prove this and recalling the Carson bandwidth rule for analog frequency-modulated signals which states that about 98% of the waveform energy is confined within a bandwidth $BW_{FM}$ given by:

$$BW_{FM} \approx 2(\Delta f + f_m),$$

where $f_m$ is the highest frequency in the modulating signal, and $\Delta f$ is the peak frequency deviation for maximum signal excursion, it is apparent that the frequency-modulated signal bandwidth $BW_{FM}$ is always larger than the modulating signal bandwidth $f_m$. Hence, the spectral components of the instantaneous frequencies of the Doppler ($\nabla \varphi_D$), phase noise ($\nabla \varphi_P$) and CFO ($\nabla \varphi_C$) terms will be contained within the Doppler bandwidth, phase noise bandwidth and CFO, respectively. Then the cutoff subcarrier $k_0$ can be safely set as equal to the maximum of the highest subcarriers having non-negligible signal contents of the Doppler, phase noise and CFO terms. Actual implementations can set different values for $k_0$ depending on the range of impairments to deal with.

Figure 2:
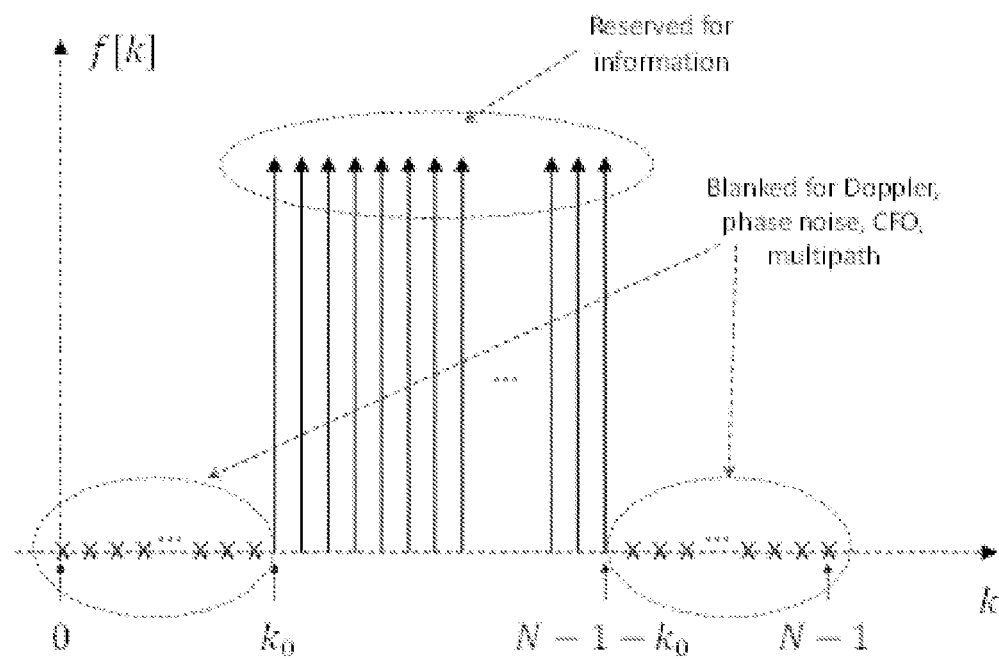
FIG. 2 is an illustration of the spectral components of the instantaneous frequency signal showing the subcarriers that are blanked to absorb Doppler, phase noise, CFO and multipath impairments.

Mathematically, after taking the inverse DFT of the discrete-time instantaneous frequency the following expression is obtained:

$$f[n] = \sum_{k \in [k_0, N-k_0-1]} x[k] \exp\left(j\frac{2\pi k n}{N}\right) + \sum_{k \notin [k_0, N-k_0-1]} \varepsilon[k] \exp\left(j\frac{2\pi k n}{N}\right) + \sum_{k=0}^{N-1} n[k] \exp\left(j\frac{2\pi k n}{N}\right)$$

where $\varepsilon[k]$ denotes the frequency components of the instantaneous frequency signal combining the Doppler, phase noise and CFO effects; and $n[k]$ are the frequency components of random noise. Apart from this last term, it is possible to reject the former impairments by picking the frequency components within the range $[k_0, N-k_0-1]$ (see FIG. 2).

The above advantages come at the cost of increased bandwidth for a given data rate. This is not a major disadvantage in mm-waves as bandwidth is foreseen to be very large because of two reasons. First, bands to be released above 6 GHz are expected to have large bandwidths, in the order of several hundreds of MHz (or even few GHz).

Second, beamforming will likely be needed to overcome the increased path loss, and hybrid RF transceiver solutions are likely to be explored comprising both digital and analog beamforming. Analog beamforming involves a number of RF phase shifters (one per antenna element) to steer the beams, whilst digital beamforming comprises a lower number of RF chains to digitally multiplex the spatial layers to be transmitted. Spatially-separated users will then be scheduled the whole carrier bandwidth, occupying different frequency regions only when sharing the same beam direction. As a consequence, users will likely enjoy very large bandwidths at high frequencies.

In contrast to spectral efficiency, considerations like energy efficiency and robustness to channel impairments get higher importance at high frequencies. The poor behavior of the RF oscillators, the large Doppler spreads, and the low efficiency of the power amplifiers demand increased waveform robustness against these impairments. The proposed waveform can benefit from the use of non-linear amplifiers at the transmitter 611 thanks to its constant envelope. Only good time synchronization and multipath detection are required at the receiver 616 in order to track the multiple echoes of the signal, with ideally no impact from Doppler, phase noise or CFO impairments, provided that the cutoff subcarrier $k_0$ is properly chosen. Beamforming at the receive side can also narrow down the number of multipaths effectively received hence easing detection.

Choice of the Cutoff Subcarrier $k_0$

The cutoff subcarrier $k_0$ is critical for providing robustness. One way to estimate $k_0$ is by passing an unmodulated constant-envelope signal through a wireless channel that contains the intended impairments:

$$s(t) = A \cos(2\pi f_c t),$$

whose baseband representation is a Dirac delta at the origin $s[n] = \delta[n]$. The baseband complex signal at the channel output $$r[n] \cong \sum_l A_l[n] \exp\{j\Phi[n-\tau_l]\} + n_0[n]$$

allows obtaining the frequency contents of the discrete-time instantaneous frequency signal $f[n]$, where $\Phi[n] \approx \varphi_D[n] + \varphi_P[n] + \varphi_C[n]$ is the global phase term containing the impairments. Given that the complex amplitudes $A_l[n]$ will be approximately constant over one symbol duration, and that $\Phi[n-\tau_l] \approx \Phi[n]$, the sum will also have approximately constant envelope. By neglecting the amplitude and taking the overall phase $c[n]$ the following instantaneous frequency signal can be obtained:

$$f[n] = \frac{1}{2\pi} \nabla \Phi[n],$$

$$f[k] = \sum_{k=0}^{N-1} f[n] \exp\left(-j\frac{2\pi k n}{N}\right)$$

Figure 3:
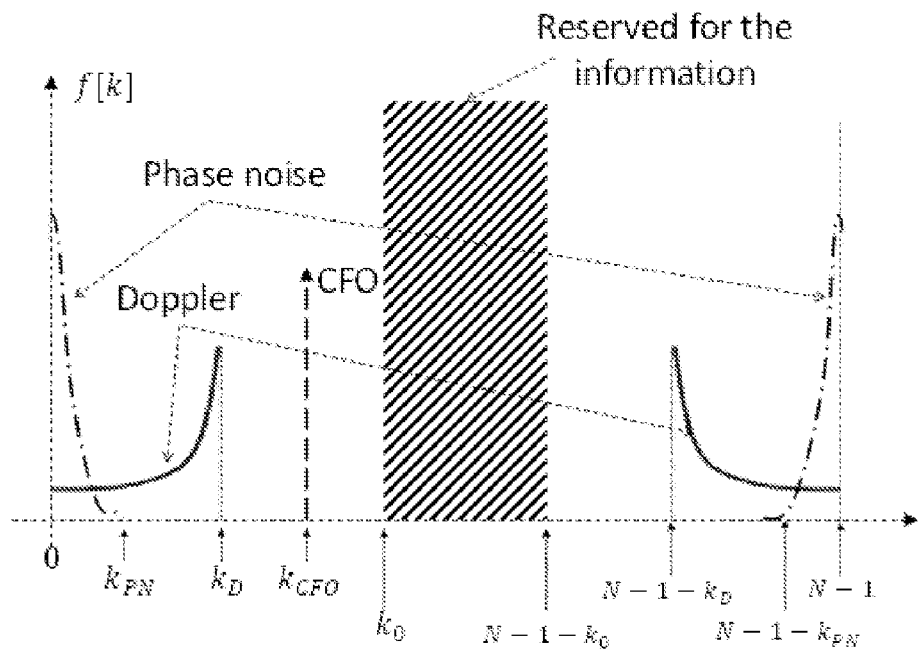
FIG. 3 is an illustration of the choice of the cutoff subcarrier $k_0$ so as to avoid phase noise, Doppler and CFO impairments. The shape of the different spectrum components is arbitrarily depicted for convenience.

$k_0$ should then be chosen above the highest subcarrier $f[k]$ with non-negligible signal contents at the worst operating conditions (e.g. maximum user speed, CFO or phase noise). FIG. 3 illustrates this procedure. In the figure, $k_{PN}$, $k_D$ and $k_{CFO}$ denote the highest subcarrier corresponding to phase noise, Doppler and CFO respectively, and $k_0 > \max(k_{PN}, k_D, k_{CFO})$.

Note that the spectrum is represented from 0 to $N-1$ (as usual in DFTs), hence the negative components of the corresponding spectra are located close to the N-th subcarrier. That is why the useful information must be contained in the range $[k_0, N-k_0-1]$.

Generation of the Proposed Waveform at the Transmitter

There can be multiple strategies for generating the proposed waveform. As a possibility, and not precluding other approaches, the proposed method comprises, for a given OFDM symbol, and assuming that the complex symbols to transmit $x[k]$ are known as a result of a constellation mapping process, constructing the discrete-time instantaneous frequency signal $\tilde{f}[n]$ by means of an inverse DFT that skips the subcarriers below $k_0$ and above $N-k_0-1$:

$$\tilde{f}[n] = m \cdot \sum_{k=k_0}^{N-k_0-1} x[k] \exp\left(j\frac{2\pi k n}{N}\right);$$

$$n = 0, 1, \ldots, N-1,$$

where m is a modulation index (in Hz per unit amplitude). Subcarriers for time offset estimation, carrying known complex symbols, are also interspersed among the subcarriers for data. The symbols x[k] must satisfy the Hermitian property: x[k]=x*[(-k)mod N], k=0, . . . , N-1, where * denotes the complex conjugate operator, and a mod b yields the remainder of a/b such that 0≤a mod b≤N-1.

Then, a cyclic prefix with length $L_{CP}$ is appended to the beginning of the discrete-time instantaneous frequency signal f̃[n], by repeating the $L_{CP}$ last samples of f̃[n] to yield the OFDM signal f[n]:

$$f[n] = \begin{cases} \tilde{f}[N - L_{CP} + n], n = 0, \ldots, L_{CP} - 1 \\ \tilde{f}[N - L_{CP}], n = L_{CP}, \ldots, N + L_{CP} - 1 \end{cases}.$$

The cyclic prefix needs to be included so as to facilitate time synchronization of the different multipath components, as will be explained below.

Then, the discrete-time unwrapped instantaneous phase is constructed by summing the instantaneous frequency signal over time:

$$\phi[n] = \phi_{-1} + 2\pi \sum_{n'=0}^{n} f[n'],$$

$$n = 0, \ldots, N + L_{CP} - 1,$$

where $\varphi_{-1}$ is an arbitrary phase term. Also, the discrete-time complex baseband signal s[n]=exp{jφ[n]} is constructed, and at the beginning a Constant Amplitude Zero Autocorrelation (CAZAC) signal of length $L_{CP}$ is appended. The CAZAC signal will be needed for time synchronization and channel estimation of the multipath components.

Finally, the resulting complex baseband signal is passed through a DAC so as to yield the continuous-time RF waveform s(t) after conversion to the carrier frequency: s(t)=A cos {2πf_ct+φ(t)}.

It is to note that the sampling period must be chosen according to the occupied bandwidth, which will be higher than the bandwidth of the OFDM signal that modulates the instantaneous frequency. The sampling frequency must be designed so as to obey the Nyquist criterion, and the OFDM symbol length (excluding the cyclic prefix) must be equal to the inverse of the desired subcarrier spacing.

Detection of the Multipath Components

The proposed waveform requires that the receiver 616 discriminates the different multipath components so as to estimate their delays, amplitudes and phases.

A mechanism must exist to facilitate time synchronization of the receiver 616 to the multiple received echoes caused by multipath, and to effectively separate them. Each of these echoes contains the original signal with variations in amplitude and phase corresponding to the already mentioned impairments (channel response, Doppler, phase noise, CFO, and AWGN). One way to achieve multipath detection is to append a signal satisfying a CAZAC property [3], such as a Zadoff-Chu sequence. Given that these sequences exhibit zero autocorrelation with any circularly shifted version of themselves, they present ideal correlation properties. Moreover, the cyclic cross-correlation between any two Zadoff-Chu sequences is a constant, the DFT of a Zadoff-Chu sequence is also Zadoff-Chu, and they present low sensitivity to frequency offsets. These properties make them ideal for detection of the multipath amplitudes, delays and phases.

Figure 4:
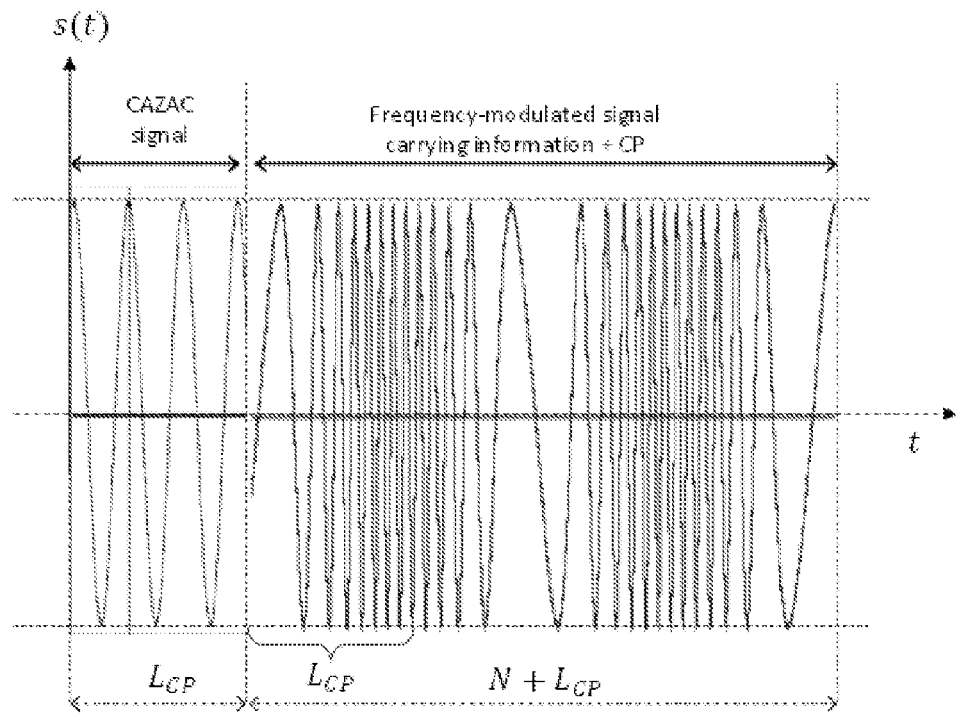
FIG. 4 is an illustration of the CAZAC signal appended to the beginning of the waveform, with a length $L_{CP}$ equal to the cyclic prefix length.

FIG. 4 shows a schematic illustration of an exemplary CAZAC sequence appended to the beginning of the proposed waveform, carrying no payload information and devoted to enable good estimation and tracking of the multipath components at the receiver. Long sequences will in general not be needed as prior time/frequency synchronization can be assumed at an initial link establishment phase. The cyclic prefix can be included at the beginning of the discrete-time instantaneous frequency signal, just as in standard OFDM, so as to absorb any time synchronization errors up to the length of the cyclic prefix. The cyclic prefix here is obviously not intended to mitigate inter-symbol interference (ISI) but to absorb the time offsets caused by time synchronization errors.

Thanks to the good correlation properties of the CAZAC signal, the receiver 616 will be able to correlate it with the received signal so as to estimate the complex amplitudes and delays. Such complex amplitudes can vary over the duration of a symbol (generally slowly), but the delays are usually constant for longer time periods because they depend on the large-scale nature of the surrounding objects.

Figure 5:
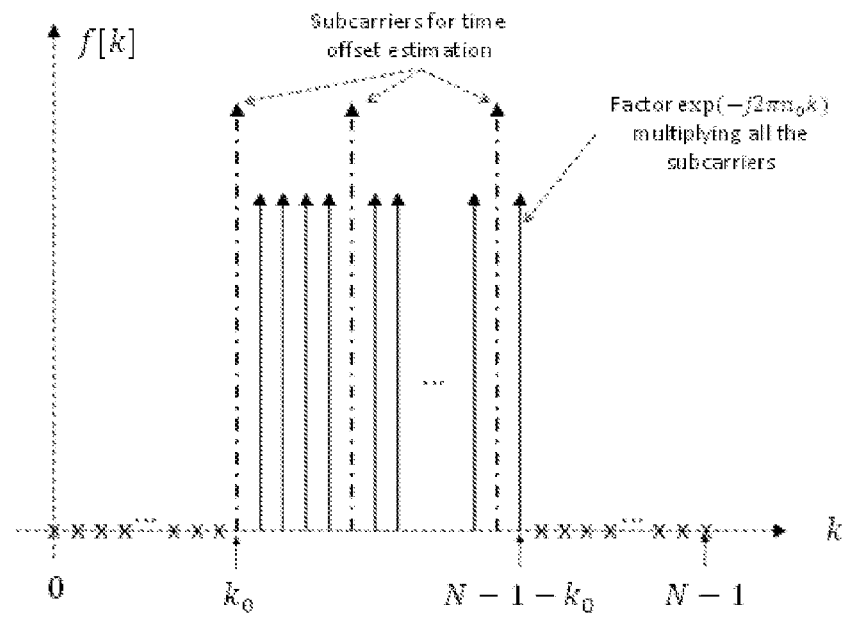
FIG. 5 shows subcarriers included for time offset estimation and compensation at the receiver side.

Estimation of the multipath delays is critical as any time offset can introduce errors in the detected phase that could distort the frequency information. To alleviate this, the cyclic prefix will be able to absorb any time offsets up to the cyclic prefix length. Hence the cyclic prefix length can be made equal to the length of the synchronization sequence. A time offset $n_0$ will be seen as a circular time shift in the detected instantaneous frequency f[n], which after the DFT will yield a factor exp(-j2πn_0k) that multiplies the subcarriers f[k] of the instantaneous frequency signal. This factor can be resolved by reserving especial subcarriers for time offset estimation carrying some known symbols. The receiver 616 can then check the contents of these subcarriers so as to estimate $n_0$ and compensate for the resulting phase shifts (see FIG. 5). Not a lot of subcarriers are necessary for time offset estimation as the phase term (-2πn_0k) can be obtained by simple least-squares estimation in the only presence of AWGN.

Recovery of the Information

Similar to what happens in transmission, recovery of the information may follow multiple strategies depending on implementation needs. Not precluding other approaches, the following is a preferred detection procedure at the receiver 616. Assuming the presence of a sequence appended at the beginning of the waveform for multipath detection, and after conversion to baseband and sampling, the receiver 616 estimates the L delays and complex amplitudes of the discrete-time multipath components of the received signal r[n], which has the form:

$$r[n] \cong \sum_{l=0}^{L-1} A_l[n] \cdot \exp j\{\Phi[n - \tau_l]\} + n_0[n],$$

where $$A_l[n] = a[n] \cdot b_l[n] \cdot \exp j(\alpha'_l + \phi_{0,l})$$

is the complex amplitude of the l-th multipath that includes the constant phase $\varphi_{0,l}$ associated to Doppler, and the global phase term Φ[n] contains the desired signal as well as the time-varying impairments: $\Phi[n] \equiv \varphi[n]+\varphi_D[n]+\varphi_P[n]+\varphi_C[n]+\varphi_0[n]$.

Then, $\Phi[n]$ is obtained by solving the previous difference equation, assuming that the values of the complex amplitudes $A_l[n]$ and delays $\tau_l$ are known, by means of for instance an IIR filter over the received signal $r[n]$. The unwrapped phase must be obtained such that it presents no discontinuities that could be derived from restriction to any range, such as $(-\pi,\pi]$ or $[0,2\pi)$.

Then, the instantaneous frequency signal $f[n]$ is obtained by means of the discrete difference operator:

$$f[n] \equiv \frac{1}{2\pi}\nabla\Phi[n]$$
$$= \frac{1}{2\pi}(\nabla\phi[n-\tau_l] + \nabla\phi_D[n] + \nabla\phi_P[n] + \nabla\phi_C[n] + \nabla\phi_0[n]).$$

Next, the receiver 616 performs the inverse DFT of the instantaneous frequency signal $f[n]$, and checks the contents of the subcarriers $f[k]$ reserved for time offset estimation. Then it estimates such time offset $n_0$ and multiplies the frequency components by a factor equal to $\exp(j2\pi n_0 k)$ to compensate it.

Finally, by examining the inverse DFT of the instantaneous frequency signal, which can be written as:

$$f[n] = \sum_{k\in[k_0,N-k_0-1]} x[k]\exp\left(j\frac{2\pi kn}{N}\right) +$$
$$\sum_{k\notin[k_0,N-k_0-1]} \varepsilon[k]\exp\left(j\frac{2\pi kn}{N}\right) + \sum_{k=0}^{N-1} n[k]\exp\left(j\frac{2\pi kn}{N}\right),$$

it is possible to discard the frequency components outside the interval $[k_0, N-1-k_0]$, and obtain estimates of the transmitted complex symbols $\hat{x}[k]=x[k]+n[k]$ with ideally no impairments from multipath, Doppler, phase noise and CFO.

It is important to emphasize the need to acquire the unwrapped phase. The discrete-time unwrapped phase can be obtained with the aid of algorithms that avoid the presence of phase discontinuities greater than $2\pi$. These algorithms seek continuity in the phases, and OFDM signals are challenging in this regard because of their large variations in the time domain. However, in the proposed waveform the larger bandwidth of the frequency-modulated signal is beneficial: given that the overall bandwidth will be larger than the bandwidth of the OFDM modulating signal $x[n]$, the sampling frequency will also have to be larger, and this will lead to smoother variations in the discrete-time phase signal which will facilitate the avoidance of phase discontinuities at the detector.

Figure 6:
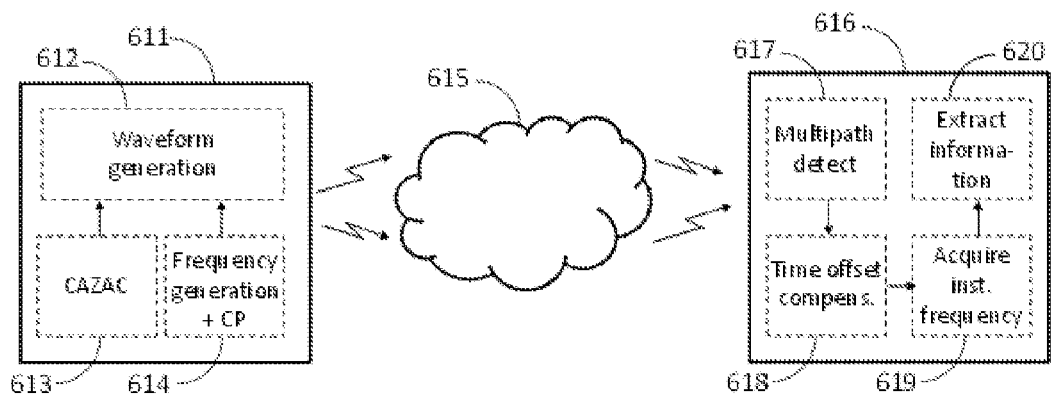
FIG. 6 illustrates an exemplary embodiment of the proposed wireless communication system showing the different elements included in the transmitter and the receiver to implement the proposed invention.

With reference now to FIG. 6, therein it is illustrated an exemplary embodiment for application of the proposed invention. Referring to the elements in the figure, the wireless transmitter 611 comprises the waveform generation module 612 which receives both the signal from a CAZAC unit 613 and from the frequency generation plus CP insertion unit 614, both of which deliver necessary elements for the creation of the proposed waveform. The resulting waveform passes through the wireless channel 615, as said before characterized at least by multipath spread, Doppler spread, and AWGN, among other impairments, and reaches the receiver 616. The receiver 616 is also characterized by some CFO and phase noise, among other impairments. The first receiver unit, or multipath detection block, 617 is able to detect the different multipath components and synchronize to each of them, and the second receiver unit, or time offset compensation unit, 618 compensates for any timing offsets resulting from detection (with the aid of subcarriers reserved for time offset estimation). A third receiver unit 619 then acquires the frequency components of the instantaneous frequency signal after discarding the subcarriers located below $k_0$ and above $N-1-k_0$, and a fourth receiver unit 620 finally extracts the information.

The proposed invention can be implemented by means of software elements, hardware elements, firmware elements, or any suitable combination of them. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The present invention can be applicable for wireless communications where Doppler and/or phase noise impairments can be very significant, such as those in high-speed wireless applications or at very high frequencies, where the oscillators can exhibit large phase noise. Suitable estimation of the cutoff subcarrier $k_0$ for the desired operating conditions can ensure that no significant Doppler, phase noise and CFO impairments will corrupt the information. Channel estimation and time synchronization to the multipath components can be achieved via CAZAC sequences with good correlation properties. Subcarriers for time offset estimation, and a cyclic prefix appended to the instantaneous frequency signal, are also included to cope with time synchronization errors. The constant envelope nature of the complex baseband signal makes it ideal for use in transmitters having non-linear power amplifiers with no or very little back-off.

The scope of the present invention is defined in the following set of claims.

REFERENCES

[1] S. C. Thompson, A. U. Ahmed, J. G. Proakis, and J. R. Zeidler, "Constant Envelope OFDM Phase Modulation: Spectral Containment, Signal Space Properties and Performance", 2004 IEEE Military Communications Conference, pp. 1129-1135, October 2004 (MILCOM 2004).

[2] Z. Pi and F. Khan, "An Introduction to Millimeter-Wave Mobile Broadband Systems", IEEE Communications Magazine, June 2011.

[3] S. Sesia, I. Toufik, M. Baker (editors), "LTE, the UMTS Long Term Evolution: From Theory to Practice" (2nd edition), John Wiley & Sons, 2011, p. 155.
[4] H. G. Myung, J. Lim, and D. J. Goodman, "Peak-to-Average Power Ratio of Single Carrier FDMA Signals with Pulse Shaping", 17$^{th}$ IEEE International Symposium on Personal, Indoor and Mobile Radio Communications (PIMRC), 11-14 Sep. 2006 (Helsinki).
[5] T. Svensson and A. Svensson, "Constrained Envelope Continuous Phase Modulation", 57$^{th}$ IEEE Vehicular Technology Conference (VTC), 22-25 Apr. 2003.
[6] J. G. Proakis and M. Salehi, "Digital Communications", 5$^{th}$ edition, McGraw-Hill, 2007, p. 885.

The invention claimed is:

1. A method to generate a wireless waveform for use in a wireless communication system, said wireless communication system comprising a transmitter (611), a wireless channel (615) and a receiver (616), said wireless channel (615) introducing at least Doppler spread, additive White Gaussian Noise and multipath spread impairments on a signal transmitted by the transmitter, and said receiver (616) introducing at least phase noise and carrier frequency offset, CFO, impairments on the received signal, characterized in that the method comprises performing by the transmitter (611) the following steps:

creating a discrete-time instantaneous frequency signal $\tilde{f}[n]$ by means of performing an inverse Discrete Fourier Transform, IDFT, of the complex symbols included in the transmitted signal skipping the subcarriers below $k_0$ and above $N-k_0-1$:

$$\tilde{f}[n] = m \cdot \sum_{k=k_0}^{N-k_0-1} x[k] \exp\left(j\frac{2\pi k n}{N}\right); n = 0, 1, \ldots, N-1$$

where m is a modulation index, in Hz per unit amplitude; $k_0$ is an integer satisfying $0 < k_0 < N/2$, denoted as cutoff subcarrier; N is the OFDM symbol length; $j \equiv \sqrt{-1}$ represents the imaginary component in the complex plane; and x[k] are complex symbols satisfying the Hermitian property:

$$x[k] = x^*[(-k) \bmod N], k = 0, \ldots, N-1,$$

where * denotes the complex conjugate operator, and a mod b yields the remainder of a/b such that $0 \le a \bmod b \le N-1$;

appending a cyclic prefix with length $L_{CP}$ to the beginning of the discrete-time instantaneous frequency signal $\tilde{f}[n]$, by repeating the last $L_{CP}$ samples of $\tilde{f}[n]$ to yield the OFDM signal f[n]:

$$f[n] = \begin{cases} \tilde{f}[N - L_{CP} + n], n = 0, \ldots, L_{CP} - 1 \\ \tilde{f}[n - L_{CP}], n = L_{CP}, \ldots, N + L_{CP} - 1 \end{cases};$$

constructing a discrete-time unwrapped instantaneous phase $\varphi[n]$ by summing the instantaneous frequency signal over time:

$$\phi[n] = \phi_{-1} + 2\pi \sum_{n'=0}^{n} f[n'], n = 0, \ldots, N + L_{CP} - 1,$$

where $\varphi_{-1}$ is an arbitrary phase term;

constructing a discrete-time complex baseband signal $s[n] = \exp\{j\varphi[n]\}$, and appending at the beginning a Constant Amplitude Zero Autocorrelation, CAZAC, signal of length $L_{CP}$ for multipath detection; and passing the constructed discrete-time complex baseband signal through a digital-to-analog, DAC, converter to yield the continuous-time radio frequency signal s(t) after conversion to the carrier frequency:

$$s(t) = A \cos\{2\pi f_c t + \varphi(t)\},$$

where $\varphi(t)$ is the continuous-time phase and $f_c$ is the carrier frequency.

2. A method according to claim 1, wherein said complex symbols x[k] comprise both symbols carrying information and additional symbols known at the receiver side and included for time offset estimation.

3. A method according to claim 1, wherein said value of the cutoff subcarrier $k_0$ is determined by:

passing an unmodulated constant-envelope signal of the form $s(t) = A \cos(2\pi f_c t)$, with baseband complex representation $s[n] = \delta[n]$, through the wireless channel (615), obtaining at an output of the wireless channel (615) the baseband complex signal $$r[n] \cong \sum_l A_l[n] \exp\{j\Phi[n - \tau_l]\} + n_0[n],$$

and then neglecting the amplitude variations and taking the unwrapped phase $\Phi[n]$;

obtaining the discrete-time instantaneous frequency signal f[n] at the output of the wireless channel (615):

$$f[n] = \frac{1}{2\pi} \nabla \Phi[n] = \frac{1}{2\pi} (\Phi[n] - \Phi[n-1]), n = 1, \ldots, N-1,$$

where $\nabla$ is the backwards difference operator, $\Phi[n]$ is the discrete-time instantaneous phase of the received signal, and $f[0] = (\Phi[0] - \varphi_{-1})/2\pi$;

obtaining frequency contents of the discrete-time instantaneous frequency signal f[n] by means of performing a DFT:

$$f[k] = \sum_{k=0}^{N-1} f[n] \exp\left(-j\frac{2\pi k n}{N}\right);$$

and selecting a value of $k_0$ above the highest subcarrier f[k] with non-negligible signal contents at the worst operating conditions including maximum user speed, maximum CFO, and maximum phase noise, by means of the equation:

$$k_0 > \max(k_{PN}, k_D, k_{CFO}),$$

where $k_{PN}$, $k_D$ and $k_{CFO}$ denote the highest subcarriers containing phase noise, Doppler and CFO respectively.

4. A method according to claim 1, wherein detection of the received signal at the receiver (616) side comprises the following steps:

estimating complex amplitudes and delays of the L discrete-time multipath components of the received signal r[n], which has the form:

$$r[n] \cong \sum_{l=0}^{L-1} A_l[n] \cdot \exp\ j\{\Phi[n-\tau_l]\} + n_0[n],$$

where $A_l[n]$ denotes the complex amplitude of the l-th multipath component; $\Phi[n]$ is the time-varying phase; $n_0[n]$ is an additive noise component; and $\tau_l$ is the delay associated to the l-th multipath;

obtaining an unwrapped phase $\Phi[n]$ by solving the difference equation in the previous step, assuming that the values of the complex amplitudes $A_l[n]$ and delays $\tau_l$ are known, where said unwrapped phase must present no discontinuities that could be derived from restriction to any range, such as $(-\pi,\pi]$ or $[0,2\pi)$;

obtaining an instantaneous frequency signal f[n] by means of the discrete difference operator:

$$f[n] \equiv \frac{1}{2\pi}\nabla\Phi[n]$$
$$= \frac{1}{2\pi}(\nabla\phi[n-\tau_l] + \nabla\phi_D[n] + \nabla\phi_P[n] + \nabla\phi_C[n] + \nabla\phi_0[n]);$$

performing the DFT of the instantaneous frequency signal f[n] to yield the frequency contents f[k], k=0, ..., N−1, and compensating for any time synchronization offset; and discarding the frequency components outside the interval $[k_0, N-1-k_0]$, and obtaining estimates of the transmitted complex symbols $\hat{x}[k]=x[k]+n[k]$ with ideally no impairments from Doppler, phase noise or CFO, where n[k] denotes the frequency components of random noise.

5. A method according to claim 4, wherein said complex symbols x[k] comprise both symbols carrying information and additional symbols known at the receiver side and included for time offset estimation and, wherein said compensation of the time synchronization offset for the instantaneous frequency signal f[n] comprises:

estimating said time synchronization offset $n_0$ by examining said symbols for time offset estimation, which are a-priori known by the receiver (616), from the subcarriers f[k] of the instantaneous frequency signal f[n]; and multiplying the subcarriers f[k] by a factor $\exp(j2\pi n_0 k)$, $k=k_0, \ldots, N-1-k_0$, to compensate said time offsets.

6. A method according to claim 4, wherein estimation of the complex amplitudes and delays of the L discrete-time multipath components comprises performing cross-correlations of the received signal with delayed versions of said CAZAC signals.

7. A method according to claim 4, wherein obtaining the unwrapped phase $\Phi[n]$ is performed by means of an Infinite Impulse Response, IIR, filter over the received signal r[n].

8. A wireless communication system, said wireless communication system comprising:
a transmitter (611);
a wireless channel (615); and
a receiver (616),
wherein said wireless channel (615) introduces at least Doppler spread, additive White Gaussian Noise and multipath spread impairments on a signal transmitted by the transmitter (611), and said receiver (616) introduces at least phase noise and carrier frequency offset, CFO, impairments on the received signal, characterized in that the transmitter (611) comprises a waveform generation unit (612) adapted and configured to generate a wireless waveform to be used in the wireless communication system by:

creating a discrete-time instantaneous frequency signal $\tilde{f}[n]$ by means of performing an inverse Discrete Fourier Transform, IDFT, of the complex symbols included in the transmitted signal skipping the subcarriers below $k_0$ and above $N-k_0-1$:

$$\tilde{f}[n] = m \cdot \sum_{k=k_0}^{N-k_0-1} x[k]\exp\left(j\frac{2\pi kn}{N}\right); n = 0, 1, \ldots, N-1,$$

where m is a modulation index, in Hz per unit amplitude; $k_0$ is an integer satisfying $0<k_0<N/2$, denoted as cutoff subcarrier; N is the OFDM symbol length; $j=\sqrt{-1}$ represents the imaginary component in the complex plane; and x[k] are complex symbols satisfying the Hermitian property:

$x[k]=x^*[(-k) \bmod N], k=0, \ldots, N-1,$ where * denotes the complex conjugate operator, and a mod b yields the remainder of a/b such that $0 \le a \bmod b \le N-1$;

appending a cyclic prefix with length $L_{CP}$ to the beginning of the discrete-time instantaneous frequency signal $\tilde{f}[n]$, by repeating the last $L_{CP}$ samples of $\tilde{f}[n]$ to yield the OFDM signal f[n]:

$$f[n] = \begin{cases} \tilde{f}[N-L_{CP}+n], n=0,\ldots,L_{CP}-1 \\ \tilde{f}[n-L_{CP}], n=L_{CP},\ldots,N+L_{CP}-1 \end{cases};$$

constructing a discrete-time unwrapped instantaneous phase $\varphi[n]$ by summing the instantaneous frequency signal over time:

$$\phi[n] = \phi_{-1} + 2\pi\sum_{n'=0}^{n} f[n'], n=0,\ldots,N+L_{CP}-1,$$

where $\varphi_{-1}$ is an arbitrary phase term;

constructing a discrete-time complex baseband signal $s[n]=\exp\{j\varphi[n]\}$, and appending at the beginning a Constant Amplitude Zero Autocorrelation, CAZAC, signal of length $L_{CP}$ for multipath detection; and passing the constructed discrete-time complex baseband signal through a digital-to-analog, DAC, converter to yield the continuous-time radio frequency signal s(t) after conversion to the carrier frequency:

$s(t)=A\cos\{2\pi f_c t+\varphi(t)\},$ where $\varphi(t)$ is the continuous-time phase and $f_c$ is the carrier frequency.

9. The wireless system of claim 8, wherein the receiver (616) comprises a set of units (617, 618, 619, 620) adapted and configured for detecting the received signal, by:

estimating, by a first receiver unit (617), complex amplitudes and delays of the L discrete-time multipath components of the received signal r[n], which has the form:

$$r[n] \cong \sum_{l=0}^{L-1} A_l[n] \cdot \exp\ j\{\Phi[n-\tau_l]\} + n_0[n],$$

where $A_l[n]$ denotes the complex amplitude of the l-th multipath component; $\Phi[n]$ is the time-varying phase; $n_0[n]$ is an additive noise component; and $\tau_l$ is the delay associated to the l-th multipath;

obtaining, by a second receiver unit (618), an unwrapped phase $\Phi[n]$ by solving the difference equation in the previous step, assuming that the values of the complex amplitudes $A_l[n]$ and delays $\tau_l$ are known, where said unwrapped phase must present no discontinuities that could be derived from restriction to any range, such as $(-\pi, \pi]$ or $[0, 2\pi)$;

obtaining, by the second receiver unit (618), an instantaneous frequency signal f[n] by means of the discrete difference operator:

$$f[n] \equiv \frac{1}{2\pi} \nabla \Phi[n]$$
$$= \frac{1}{2\pi}(\nabla \phi[n - \tau_l] + \nabla \phi_D[n] + \nabla \phi_P[n] + \nabla \phi_C[n] + \nabla \phi_0[n]);$$

performing, by the second receiver unit (618), the DFT of the instantaneous frequency signal f[n] to yield the frequency contents f[k], k=0, ... , N−1, and compensating for any time synchronization offset;

discarding, by a third receiver unit (619), the frequency components outside the interval $[k_0, N-1-k_0]$; and obtaining, by a fourth receiver unit (620), estimates of the transmitted complex symbols $\hat{x}[k]=x[k]+n[k]$ with ideally no impairments from Doppler, phase noise or CFO, where n[k] denotes the frequency components of random noise.

10. A computer program product including code instructions that when executed in a computer are configured to implement the steps of the method of claim 1.

* * * * *